(12) United States Patent
McAlpine et al.

(10) Patent No.: US 11,560,676 B2
(45) Date of Patent: Jan. 24, 2023

(54) DETERMINE OPTIMAL FREQUENCY TO LOAD HAUL TRUCK

(71) Applicant: Caterpillar Paving Products Inc., Brooklyn Park, MN (US)

(72) Inventors: Jacob J. McAlpine, Otsego, MN (US); John L. Marsolek, Watertown, MN (US); Muthushankar Raghunathan, Chennai (IN)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 1006 days.

(21) Appl. No.: 16/274,449

(22) Filed: Feb. 13, 2019

(65) Prior Publication Data

US 2020/0256021 A1    Aug. 13, 2020

(51) Int. Cl.

| | |
|---|---|
| *E01C 19/10* | (2006.01) |
| *G06Q 10/06* | (2012.01) |
| *E01C 19/00* | (2006.01) |
| *G08G 1/00* | (2006.01) |
| *E01C 19/20* | (2006.01) |

(Continued)

(52) U.S. Cl.
CPC ... *E01C 19/1063* (2013.01); *G06Q 10/06313* (2013.01); *E01C 19/002* (2013.01); *E01C 19/08* (2013.01); *E01C 19/1068* (2013.01); *E01C 19/20* (2013.01); *E01C 19/46* (2013.01); *G08G 1/20* (2013.01)

(58) Field of Classification Search
CPC .... E01C 19/002; E01C 19/08; E01C 19/1063; E01C 19/1068; E01C 19/20; E01C 19/46; G06Q 10/06313; G08G 1/20

USPC ............ 404/72, 75, 84.05–85, 117–123; 701/1–10

See application file for complete search history.

(56) References Cited

U.S. PATENT DOCUMENTS

| | | | |
|---|---|---|---|
| 4,823,366 A | * | 4/1989 | Williams .......... E01C 19/48 377/16 |
| 5,015,120 A | | 5/1991 | Brock et al. |

(Continued)

FOREIGN PATENT DOCUMENTS

| | | |
|---|---|---|
| CN | 1503157 | 6/2004 |
| CN | 1547635 A | 11/2004 |

(Continued)

OTHER PUBLICATIONS

"U.S. Appl. No. 16/239,228, Non Final Office Action dated Apr. 27, 2021", 15 pgs.

(Continued)

*Primary Examiner* — Raymond W Addie
(74) *Attorney, Agent, or Firm* — Schwegman, Lundberg & Woessner

(57) ABSTRACT

A method of determining optimal frequency to load haul trucks can include a central controller receiving an indication of the amount of paving material at a paving machine, and an indication of production rate of the paving machine. The central controller can then determine when more paving material should be provided to the paving machine. Based on this determination, the central controller can provide alerts or triggers to a paving material plant to indicate when haul trucks should be loaded to provide additional paving materials to the paving machine.

18 Claims, 4 Drawing Sheets

(51) Int. Cl.
*E01C 19/46* (2006.01)
*E01C 19/08* (2006.01)

(56) References Cited

U.S. PATENT DOCUMENTS

| | | | |
|---|---|---|---|
| 5,452,966 A * | 9/1995 | Swisher, Jr. | E01C 23/04 |
| | | | 404/108 |
| 5,540,518 A * | 7/1996 | Wambold | E01C 23/163 |
| | | | 404/94 |
| 6,611,755 B1 | 8/2003 | Coffee et al. | |
| 6,805,516 B2 | 10/2004 | Barnat et al. | |
| 8,356,957 B2 | 1/2013 | Weiser | |
| 8,626,541 B2 | 1/2014 | Doan et al. | |
| 9,481,964 B1 | 11/2016 | Marsolek | |
| 9,545,048 B2 | 1/2017 | Pickett et al. | |
| 9,562,334 B2 | 2/2017 | Von Der Lippe et al. | |
| 9,611,595 B2 | 4/2017 | Marsolek et al. | |
| 2002/0182009 A1 | 12/2002 | Barnat et al. | |
| 2006/0045620 A1 * | 3/2006 | Olson | E01C 19/006 |
| | | | 404/101 |
| 2009/0142133 A1 * | 6/2009 | Glee | E01C 19/48 |
| | | | 404/90 |
| 2009/0324331 A1 * | 12/2009 | Glee | E01C 23/07 |
| | | | 404/75 |
| 2012/0263530 A1 | 10/2012 | Buschmann et al. | |
| 2012/0288328 A1 | 11/2012 | Minich | |
| 2013/0136539 A1 * | 5/2013 | Aardema | G01K 1/14 |
| | | | 73/862.55 |
| 2013/0290062 A1 | 10/2013 | Patel et al. | |
| 2014/0186115 A1 * | 7/2014 | Graham | E01C 19/4873 |
| | | | 404/75 |
| 2015/0262433 A1 | 9/2015 | Davidson | |
| 2016/0203651 A1 | 7/2016 | Heath et al. | |
| 2017/0060126 A1 | 3/2017 | Marsolek et al. | |
| 2017/0130405 A1 | 5/2017 | Engelmann | |
| 2017/0205999 A1 | 7/2017 | Marsolek | |
| 2017/0228108 A1 * | 8/2017 | Marsolek | G07C 5/008 |
| 2017/0356140 A1 | 12/2017 | Neumann | |
| 2018/0238000 A1 * | 8/2018 | Blank | E01C 19/202 |

FOREIGN PATENT DOCUMENTS

| | | |
|---|---|---|
| CN | 101273172 A | 9/2008 |
| CN | 102747671 B | 6/2016 |
| CN | 108463834 A | 8/2018 |
| EP | 0381882 | 7/1995 |
| WO | 2007/117287 A1 | 10/2007 |

OTHER PUBLICATIONS

"U.S. Appl. No. 16/239,228, Response filed Jun. 10, 2021 to Non Final Office Action dated Apr. 27, 2021", 12 pgs.

"U.S. Appl. No. 16/239,228, Final Office Action dated Jun. 25, 2021", 5 pgs.

"U.S. Appl. No. 16/239,228, Response filed Aug. 18, 2021 to Final Office Action dated Jun. 25, 2021", 13 pgs.

Search Report and Office Action for Chinese Patent Appln. No 202010088923.2, dated Aug. 3, 2022 (12 pgs), with partial English translation (2 pgs).

* cited by examiner

DETERMINE OPTIMAL FREQUENCY TO LOAD HAUL TRUCK

TECHNICAL FIELD

The present application relates generally to paving operations. More particularly, the present application relates to a method for communicating with operators at plants that provide materials for paving operations.

BACKGROUND

Paving machines are used to deposit a specified distribution of a paving material, such as asphalt, over a base surface, such as a road or bridge. Typical paving machines include a hopper containing a supply of a paving material mixture such as asphalt, and a screed that lays the asphalt paving material onto an area to be paved in a strip of uniform thickness. Paving material is usually prepared at a plant that may be located close to or some distance from the surface being paved. Coordination of communications between a plant and a paver is discussed in U.S. Pat. No. 9,481,964 by Marsolek, issued Nov. 1, 2016, which discusses systems for communication between a plant and paving machine, among other communications.

In a typical paving operation, a continuous mat of material is formed behind the paving machine as the paving machine travels forward along the base surface. A compactor follows the paving machine and rolls over sections of the formed material mat until the formed material mat is compacted to a desired degree. Preferably, the formed material mat is formed such that the material is within a desired temperature band at least at the time that the compactor rolls over a given section of the formed material mat. One way to maintain the material within the desired temperature band is to continuously operate the paving machine, with little or no stopping of the paving machine. Such continuous operation can be ensured by providing paving material to the paving machine at periodic intervals, the periodicity being based on factors such as speed of paving or paving production rate, size of the paving job, etc.

The paving material is made in batches at the plant and transported by haul truck. If the batch of paving material remains in the haul truck too long, it becomes unusable in the paving operation and it is therefore undesirable to continuously have haul trucks standing idle and waiting to unload into the paving machine. On the other hand, it is also undesirable for the paving machine to have to wait for paving material, because the paving machine screed may continue to heat the newly-formed material mat beneath the screed, causing the newly-formed material mat to reach a temperature outside the desired temperature band described above. Therefore, it is important to control the timing with which haul trucks deliver paving material to paving machines.

SUMMARY OF THE INVENTION

A method for controlling frequency of loading for a load truck can include receiving, from a paving machine, a signal indicating an amount of paving material currently at the paving machine and a production rate of the paving machine. The method can further include determining a time at which to provide additional paving material to the paving machine based on the amount of paving material at the paving machine and on the production rate. The method can further include providing an alert to trigger loading paving material into a haul truck based on the determined time.

A system for controlling frequency of loading a haul truck can include a network interface device to receive a signal indicating an amount of paving material currently at a paving machine and a production rate of the paving machine. The system can further include a hardware processor coupled to the network interface device and configured to determine a time at which to provide additional paving material to the paving machine based on the amount of paving material at the paving machine and on the production rate. The hardware processor can encode, for transmission over the network interface device, an alert to trigger loading paving material into a haul truck based on the determined time.

A computer-readable medium can include instructions that, when implemented on the apparatus, cause the apparatus to receive an indication of an amount of paving material currently at a paving machine and a production rate of the paving machine. The instructions can also cause the apparatus to determine a time at which to provide additional paving material to the paving machine based on the amount of paving material at the paving machine and on the production rate. The instructions can also cause the apparatus to encode an alert to trigger the loading of paving material into a haul truck based on the determined time.

DETAILED DESCRIPTION

Among other things, the inventors have recognized that a plant communication system can receive signals to indicate when a haul truck should be loaded to optimally maintain temperature of paving materials at a paving machine. An alert can be produced to indicate when paving material should be loaded at the plant.

Figure 1:
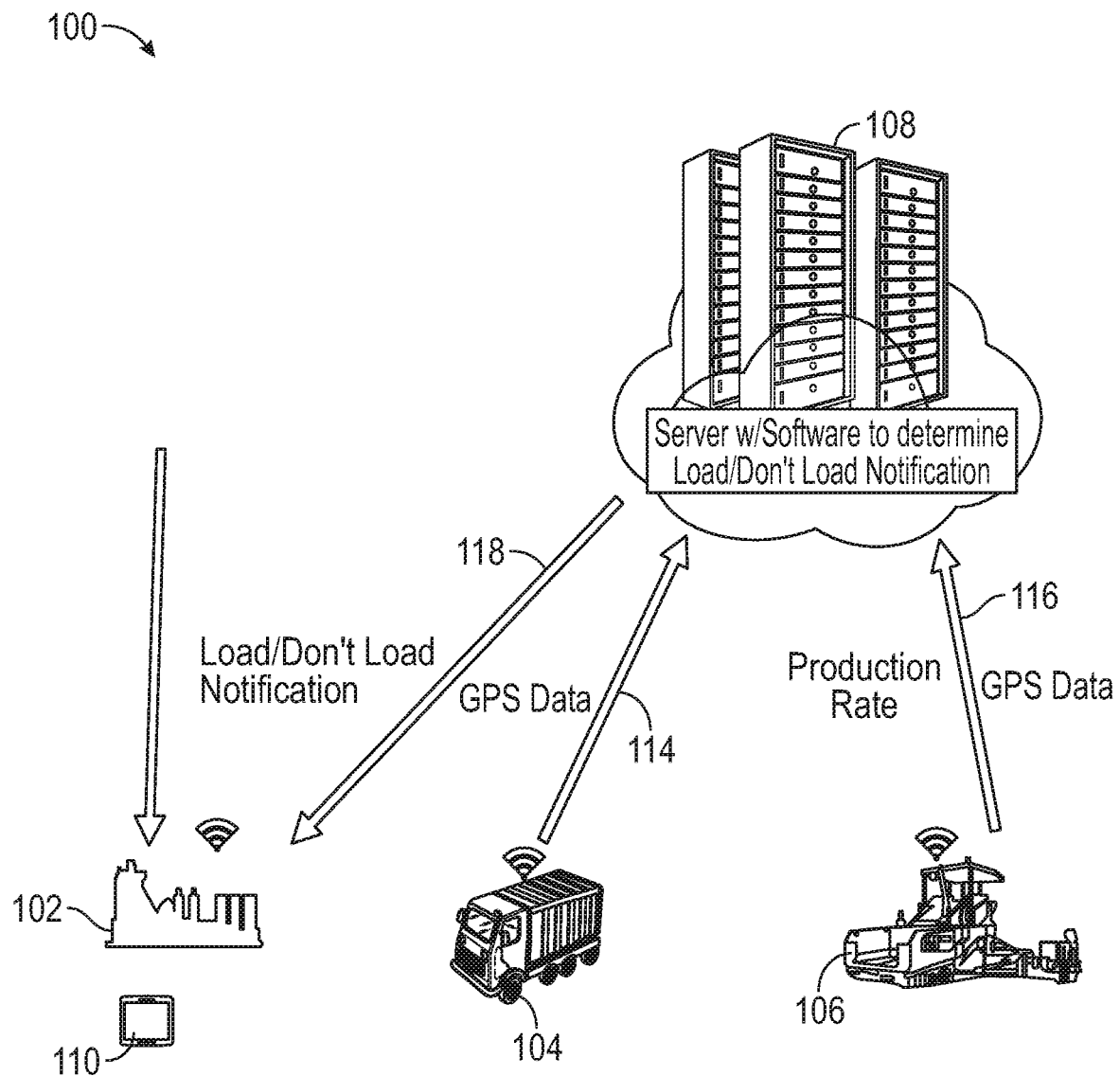
FIG. 1 depicts a schematic illustration of a paving system according to some embodiments.

Referring to FIG. 1, a paving system 100 includes at least one plant 102 in which paving materials such as asphalt is produced and loaded onto supply machines (e.g., haul truck/s 104). Haul truck/s 104) transports paving material, and a paving machine 106 applies a layer of paving material such as asphalt to a work surface at a paving site. Other machines, such as compactors (not shown) and remixing transfer vehicles (not shown) may also form a portion of the paving system 100.

A control system 108 associated with the paving system 100 can control the paving system 100 and provide for communication between the paving machine 106, haul truck/s 104, etc. and the plant 102. The control system 108 can include a server system that executes software and that receives input signals from, and provides control signals to, the plant 102 and each of the machines associated with the paving system 100. The server system can be remotely operated or included within the plant 102.

The control system 108 can communicate to the plant 102, haul truck/s 104, and paving machine/s 106 or any other element of the paving system 100 using circuitry described below with reference to FIG. 4. The control system 108 can also access remote data including weather data and traffic data. The input signals 114, 116 from the machines can include global positioning system (GPS) data, production rate, etc. The control system 108 may transmit signals 118 to control the operation of the plant 102 and the operation of the machines of the paving system 100 as well as generate desired communications. For example, the signal/s 118 can include notifications regarding the loading of haul truck/s 104 as described in more detail below, to provide for continuous operation of the paving machine 106.

The plant 102 can be used to produce paving material (e.g., asphalt or other materials) in batches. The characteristics of each batch stored can be set based upon the desired characteristics for a particular paving job. For example, the amount of oil and the size of the aggregate may be set based upon the desired characteristics of the paving material and the requirements of each paving job. The batches can be stored until loaded into haul truck/s 104. The properties of each batch can vary depending on the requirements of each paving job. Each batch is mixed at the plant 102 and maintained at a desired temperature, based on factors such as chemical properties of the material in the batch, weather, the expected time required for the haul truck 104 to drive from the plant 102 to the paving machine 106 as well as any expected or anticipated waiting time for the truck at the paving site. Plant 102 may include a plant control system 110.

The plant 102 can also include temperature sensors, scales, and other measuring equipment to determine the temperature of paving material and the amount of paving material to be loaded into haul truck 104. Data for these sensors can be stored in the plant control system 110, the control system 108, or a combination of the two.

Haul truck 104 can transport paving material between plant 102 and a paving machine 106. While one haul truck 104 and one paving machine 106 are shown, it will be appreciated that any number of haul trucks and paving machines may be used. More specifically, a haul truck 104 may be loaded with paving material at a desired temperature at the plant 102. The haul truck 104 may then travel to the appropriate paving machine 106 or other vehicle. The haul truck 104 can also include a load monitoring system and sensors for measuring paving material temperature and other paving-related values, in addition to sensors for interacting with a GPS system.

Figure 2:
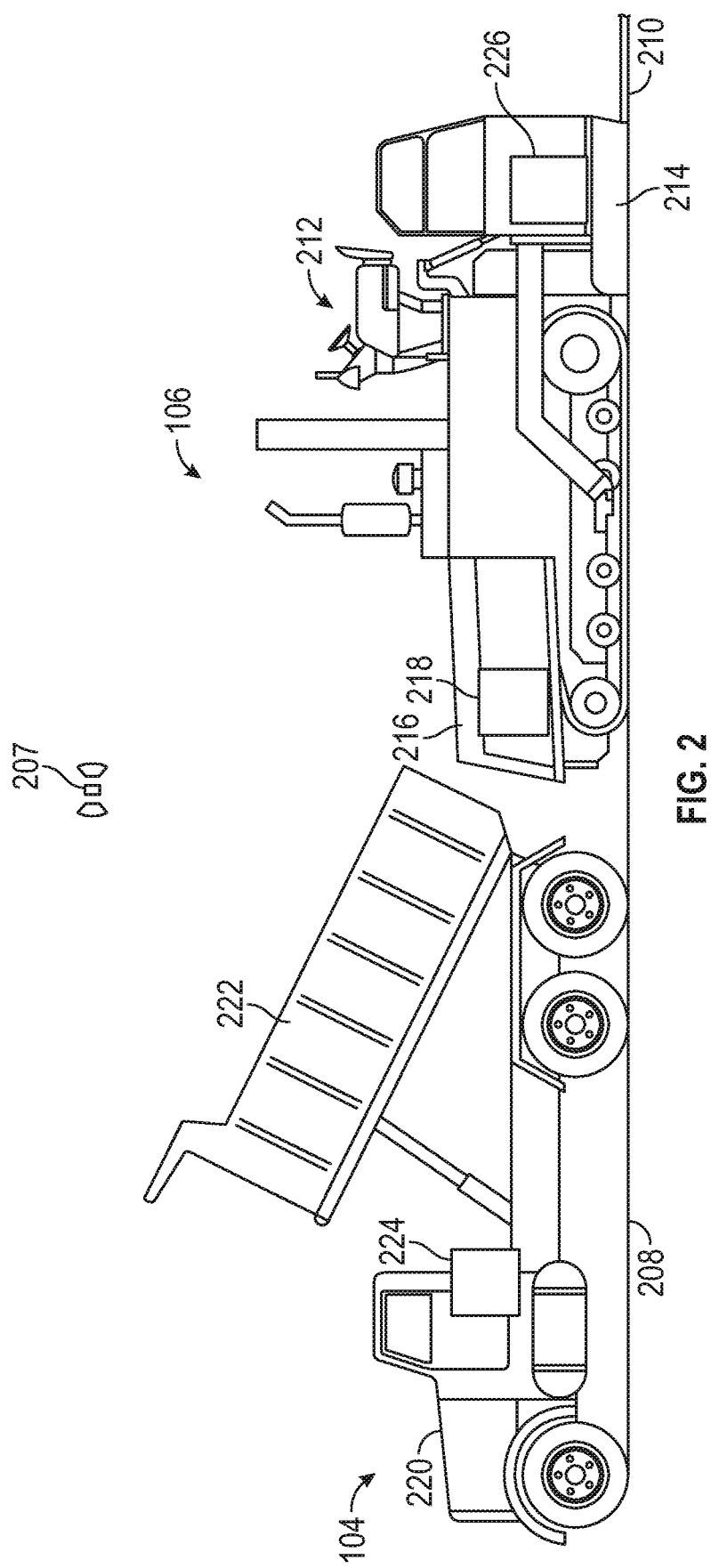
FIG. 2 depicts a diagram of a paving machine in operation with a haul truck according to some embodiments.

FIG. 2 depicts a diagram of a paving machine 106 in operation with a haul truck 104 according to some embodiments. The paving machine 106 can include an operator area 212, a screed 214, and a hopper 216. The haul truck 104 can include a cab 220, a box 222, and a haul truck controller 224. The haul truck controller 224 can include a smart phone or other device for receiving GPS data, weather data, traffic data, etc. Some data can be provided by unmanned aerial vehicle (UAV) 207. The haul truck controller 224 can include components similar to those shown in FIG. 4.

Paving machine 106 is supplied with paving material by the haul truck 104 and applies a layer of paving material to a region 210. In some instances, the paving machine 106 may push the haul truck 104 while the paving machine 106 is simultaneously applying a layer of paving material and the haul truck is loading paving material into the paving machine.

Paving machine 106 may include a material receiving unit such as a hopper 216 for storing paving material supplied via haul truck 104, and a material application system including a screed 214 for working paving material in a conventional manner. The screed 214 can be a compaction device used to compact the paving material. In some embodiments, the screed 214 can be towed behind the paving machine 106, while in other embodiments the screed can be a component of the machine.

The paving machine 106 can include a paving machine controller 218. The paving machine controller 218 may also include components located remotely from the machine such as any of the other machines of the paving system 100, at the plant 102, or elsewhere. The paving machine controller 218 can be generally include components of the control system 108 and further including user interfaces coupled to or in communication with the operator area 212. As such, the paving machine controller 218 can include at least the components of the system 400 depicted in FIG. 4 described in more detail below. The operator area 212 may include devices for controlling the paving machine 106 and one for displaying information relevant to the operation of the machine and a paving operation.

Paving machine 106 may be equipped with sensors such as a temperature sensor 226 at the hopper 216 or the screed 214 or as a component of the paving machine controller 218. Additional sensors may be provided such as a mix delivery or feed rate sensors to determine the rate at which material from the hopper 216 is being fed to the screed 214. Information regarding the paving machine 106 and its payload may be stored or determined by the paving machine controller 218 or any other controller described herein at the plant 102 or elsewhere in the system 100.

During operation, the control system 108, plant control system 110, haul truck controller 224, paving machine controller 218, and other remote or local systems and devices may transmit to each other signals indicative of characteristics associated with each plant/machine, its operation, and its associated paving material. Examples of information that the plant control system 110 may transmit to each haul truck controller 224 include various aspects or characteristics of the load being transported by the haul truck, such as temperature, volume, weight, material type, load time, identification information, etc. The haul truck controller 224 can store this information and other information for transmission to the paving machine controller 218, or in some examples, the plant control system 110 may transmit information directly to the paving machine controller 218.

The haul truck controller 224 can transmit location information, speed information, capacity information, unload time, re-load time (if needed), truck identification information, or other information to the plant control system 110. In some examples, this or other information can also be transmitted from the haul truck controller 224 to the paving machine controller 218. The haul truck controller 224 can also transmit time of arrival, truck dimensions, material type, current material temperature and other information used for offloading paving material, to the paving machine controller 218.

The paving machine controller 218 can transmit certain information back to the plant, including GPS data, paving speed, rate of application of paving material, amount of material needed to complete paving job, temperature of paving material (at application and/or while being stored at the paving machine in hopper 216), conditions of the paving material, etc. Plant operators can use the information to determine whether to change characteristics of the paving material.

The paving machine controller 218 can also transmit at least the above information to the control system 108. The control system 108 can use this or other information to send load/don't load notifications to the plant control system 110. For example, the control system 108 can analyze rate of paving, and the temperature of the paving material at the time of loading, time of paving, and at other times. The control system 108 can analyze the location of the haul truck/s 104 to estimate, for example, arrival time at the plant 102, arrival time at the paving machine/s 106, and the analysis can be performed in combination with traffic data, weather data, etc.

Using all or some of this information as an input, the control system 108 may generate a load/don't load notification to be displayed in a user-friendly fashion to the plant control system 110, for example, the notification can be displayed on video display of the plant control system 110. Such operation may improve the efficiency of operation of the load truck's 104 load and haul cycles because the load truck/s will spend less time waiting at the paving machine/s 106, and the number of load truck/s 104 needed may be reduced. Such operation can also improve plant 102 efficiency because paving material production can be performed only when needed to maintain continuous paving operations.

In some embodiments, machine learning can be used, at the control system 108 or plant control system 110, to learn fastest routes. These routes can be stored for future use in memory of the plant control system 110, paving machine controller 218, or haul truck controller 224. Machine learning can also adjust paving material load times based on problems with paving material temperature or other paving operations reported by the plant operator, haul truck controller 224, or paving machine controller 218. For example, if an issue with over-cooling of paving material was noticed at the paving machine controller 218. machine learning can be used to indicate that a haul truck 104 should be loaded sooner. Other logging can be performed for diagnostics and analysis, and such data can be stored in memory of the paving machine controller 218, plant control system 110, haul truck controller 224 or other system.

In some embodiments, the control system 108 can access or receive a paving plan for a paving job, paving period, etc. The paving plan can specify the amount of surface to be paved in a given time frame, the number of machines (paving machine's 106, haul truck/s 104, etc.) that will be used, and other data points relevant to determining whether and when to provide load notifications to the plant control system 110.

The control system 108 can make an estimate of the desired temperature of the paving material at time of loading into the haul truck/s 104, time of loading into paving machine/s 106, or other relevant time. The control system 108 can use the estimate, in conjunction with later temperature measurements, to determine whether to adjust the timing of load notifications. The estimate can be based on ambient temperature, traffic conditions, size and availability of the haul truck/s 104, etc.

Based upon the distance between the haul truck 104 and the paving machine 106, amount of material at the paving machine, travel time estimates, etc., the control system 108 can estimate the urgency required for load notifications. The control system 108 can also provide a time estimate to the plant control system 110 to estimate a future time at which loading may be necessary. The plant control system 110 could thereby slow or speed paving material operations based on the future time estimate.

Embodiments as described above can help maintain paving material within a desired temperature range by allowing operators to continuously operate the paving machine, with little or no stopping of the paving machine. Such continuous operation can be ensured by providing paving material to the paving machine at predetermined intervals based on any of the factors described above such as ambient temperature and production rate (e.g., the amount of paving material being applied per unit time).

Figure 3:
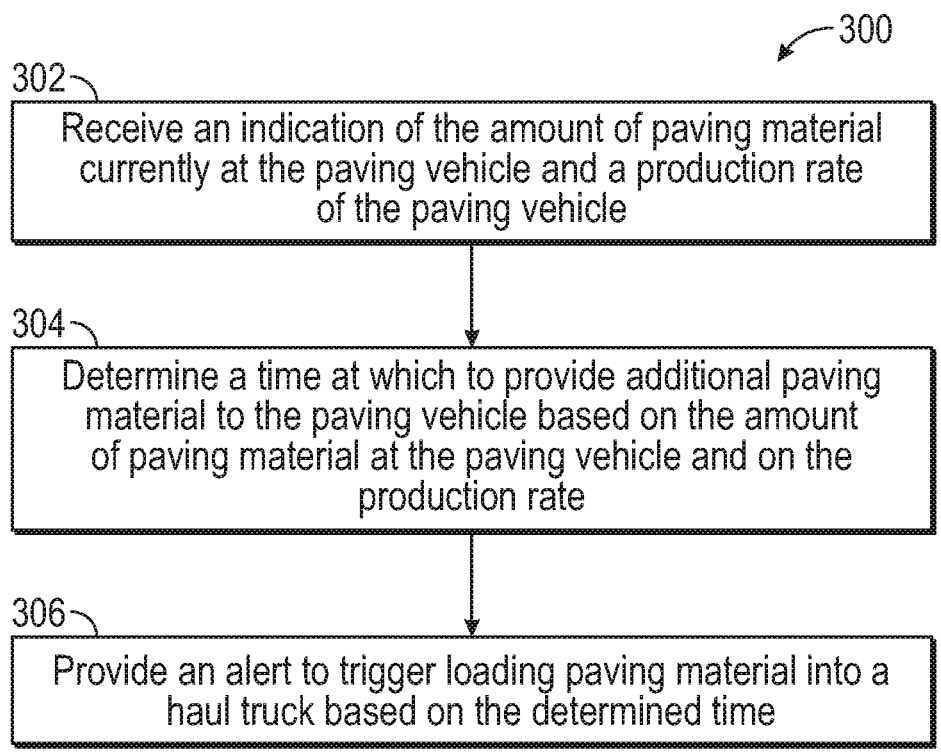
FIG. 3 is a flowchart of a method for managing loading of a haul truck according to some embodiments.

FIG. 3 is a flowchart of a method for managing loading of a haul truck according to some embodiments. The method 300 can be implemented by the control system 108 or components thereof, for example components as shown in FIG. 4. Operations of method 300 are illustrated in a particular order for convenience and clarity. Many of the discussed operations can be performed in a different sequence or in parallel, and some operations may be excluded, without materially impacting other operations.

The method 300 begins at operation 302 with the control system 108 receiving, from a paving machine (e.g., paving machine 106 (FIG. 1)), a signal (e.g., signal 116 (FIG. 1)) indicating an amount of paving material currently at the paving machine 106. The signal 116 can also indicate paving speed of the paving machine 106, production rate, or other parameter that can indicate the length of time until the paving machine 106 runs out of paving material.

The method 300 continues with operation 304 with the control system 108 determining a time at which to provide additional paving material to the paving machine based on the amount of paving material at the paving machine and on the paving speed.

The method 300 continues with operation 306 with the control system 108 providing an alert to trigger loading paving material into a haul truck 104 based on the determined time. The alert can include a load/don't load notification similar to signal 118 (FIG. 1). The alert can be provided to a paving material plant 102 and received, for example, at plant control system 110.

The trigger can be provided based on an estimated time between loading paving material into the haul truck and arrival of the haul truck 104 at the paving machine 106. In support of generating this estimated time, the method 300 can further include receiving, from the haul truck, a haul truck location signal (e.g., signal 114, FIG. 1) indicative of a location of the haul truck 104. The method 300 can further include providing an estimated arrival time of the haul truck 104 at a paving material plant 102 based on the location of the haul truck 104. The method 300 can further include providing a trigger to trigger production of a batch of paving material based on the estimated arrival time. The method can include accessing at least one of traffic information and weather information within a range of the location of the haul truck 104. The method 300 can further include adjusting the estimated arrival time based on at least one of the traffic information and the weather information.

As described earlier herein, temperature of paving material, during loading, application, and other phases of a paving operation, is important to maintain quality of a paved surface and controlling temperature is one way to maintain this quality. Therefore, the method 300 can further include operations for receiving indications of temperature and controlling temperature of paving material. For example, the method 300 can further include adjusting the determined time of the trigger based on estimated cooling of the paving material between loading the paving material into the haul truck 104 and arrival of the haul truck 104 at the paving machine 106. The method 300 can further include receiving temperature information from the paving machine 106 indicative of temperature of the paving material during various phases before, during and after paving. For example, temperature of the paving material can be provided during loading of the paving material into the paving machine 106, application of the paving material to a region 210, and a time subsequent to application of the paving material to the region 210. For example, heat sensors of the paving machine 106 can determine temperature of the paving material after the paving material has been applied. Such heat sensors can be infrared or other imaging systems and heat sensors for detecting cool spots or other problem areas in a paving surface.

Responsive to detecting problems with temperature, the method 300 can further include adjusting the determined time for the trigger. In addition, the method 300 can further include receiving information from the paving machine 106 indicating overcooling of the paving material at a hopper 216 (or other component) of the paving machine 106, and adjusting the trigger based on overcooling. The method 300 can include receiving information from the paving machine indicating overheating of the paving material at a screed 214 (or other component) of the paving machine 106 and adjusting the trigger responsive to receiving indications of overheating and overcooling.

When more than one haul truck 104 is included, any of the above operations of method 300 can be adjusted accordingly. For example, the paving machine 106 can be loaded more frequently by smaller haul trucks 104, or the plant control system 110 can adjust the frequency of batch production, loading, or other operations.

Figure 4:
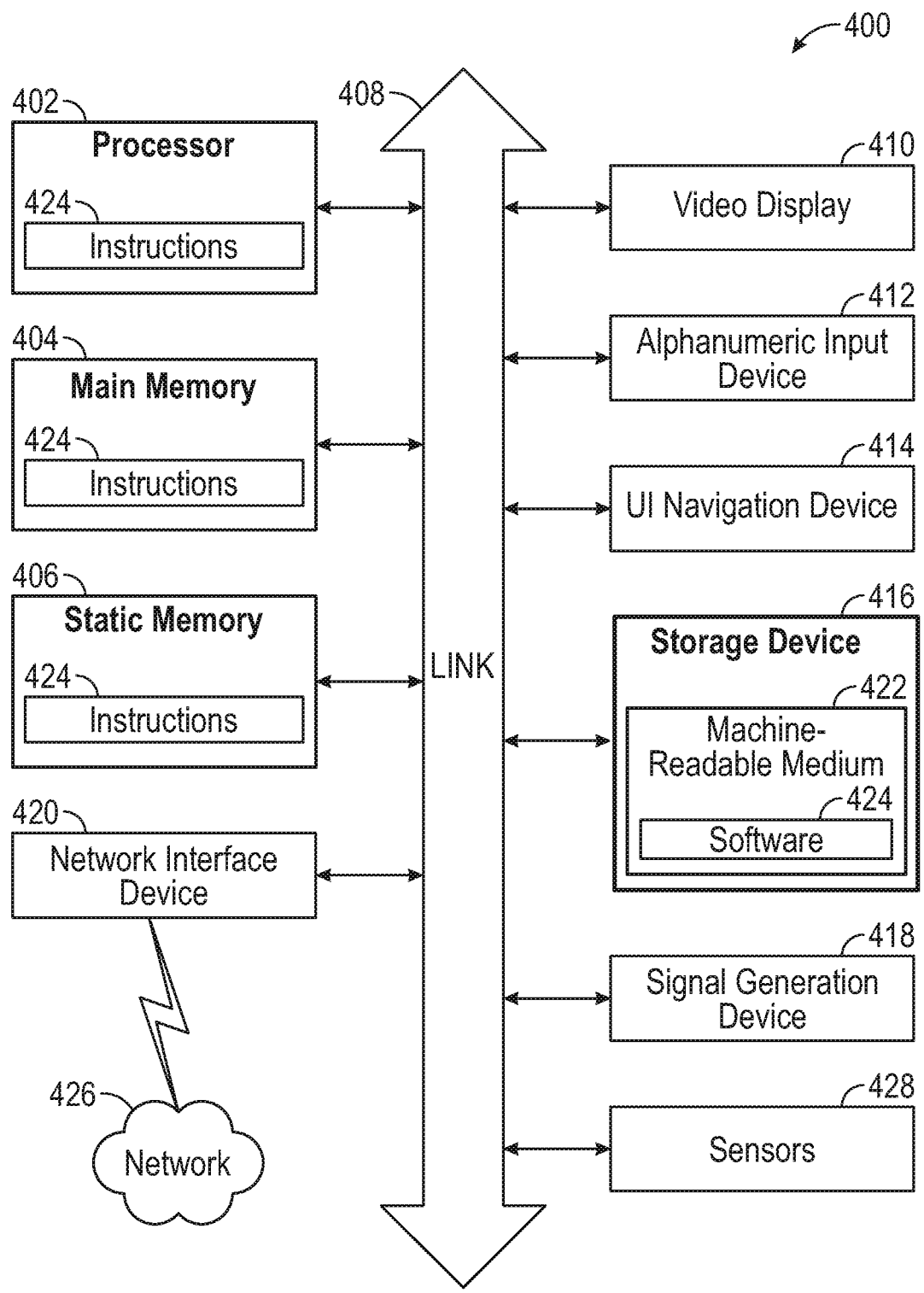
FIG. 4 depicts a block diagram of a system for implementing some embodiments.

FIG. 4 depicts a block diagram of a system 400 for implementing sonic embodiments. For example, the control system 108. plant control system 110, paving machine controller 218, and other controls and communications systems can be implemented using the components of the system 400. In alternative embodiments, the system 400 may operate as a standalone device or may be connected (e.g., networked) to other machines. The system 400 can include or comprise a mobile device, personal computer (PC), a tablet PC, a set-top box (STB), a personal digital assistant (PDA), a mobile telephone, a smart phone, a web appliance, a server, data center component or node, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The system 400 may include a hardware processor 402 (e.g., a central processing unit (CPU), a graphics processing unit (GPU), a hardware processor core, or any combination thereof), a main memory 404 and a static memory 406, sonic or all of which may communicate with each other via an interlink (e.g., bus) 408. The system 400 may further include a display unit 410, an alphanumeric input device 412 (e.g., a keyboard), and a user interface (UI) navigation device 414 (e.g., a mouse). In an example, the display unit 410, alphanumeric input device 412 and UI navigation device 414 may be a touch screen display. The system 400 may additionally include a. storage device e.g., drive unit) 416, a signal generation device 418 (e.g., a speaker), a network interface device 420, and one or more sensors 428, such as a global positioning system (GPS) sensor, compass, temperature accelerometer, or other sensor. The system 400 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 416 may include a computer-readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the system 400. In an example, one or any combination of the hardware processor 402, the main memory 404, the static memory 406, or the storage device 416 may constitute computer-readable media. In some embodiments, the computer-readable medium may be or may include a non-transitory computer-readable storage medium. In some embodiments, the computer-readable medium may be or may include a computer-readable storage medium.

While the computer-readable medium 422 is illustrated as a single medium, the term "computer-readable medium" may include a single medium or multiple media (e.g., a centralized or distributed database, and/or associated caches and servers) configured to store the one or more instructions 424. The term "computer-readable medium" may include any medium that is capable of storing, encoding, or carrying instructions for execution by the system 400 and that cause the system 400 to perform any one or more of the techniques of the present disclosure, or that is capable of storing, encoding or carrying data structures used by or associated with such instructions. Non-limiting computer-readable medium examples may include solid-state memories, and optical and magnetic media. Specific examples of computer-readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, computer-readable media may include non-transitory computer-readable media. In some examples, computer-readable media may include computer-readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426.

In an example, the network interface device 420 may include a plurality of antennas to wirelessly communicate.

The term "transmission medium" shall be taken to include any intangible medium that is capable of storing, encoding or carrying instructions for execution by the system 400, and includes digital or analog communications signals or other intangible medium to facilitate communication of such software. In some embodiments, the network interface device 420 can operate on one or more of the control system 108, plant control system 110, paving machine controller 218 to establish communication channels between each other to permit communications between respective machines or with other controllers, computers, etc. In some embodiments, the connection channel may be established upon identifying and coupling between unique identifiers associated with a pair of machines. For example, upon the haul truck 104 and paving machine 106 moving into proximity of each other, the network interface device 420 can be used to provide a pairing or coupling between the haul truck 104 and paving machine 106. The haul truck 104 and paving machine 106 can then determine characteristics of each other, such as size, paving material type, payload, etc., using the established coupling. In some embodiments, this and other data can also be transmitted when the haul truck 104 and paving machine 106 are further apart. Such data can include estimated time of arrival, paving material type, haul truck 104 characteristics, current temperature of the paving material, batch identifiers, paving speed, amount of material at the paving machine 106, etc. Some or all of the transmitted data can also be provided to video display 420 for each machine where relevant.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

INDUSTRIAL APPLICABILITY

The disclosed systems may be applicable to paving operations including monitoring haul trucks traveling between a paver, jobsite, and plant where the haul trucks deliver paving materials to the paver to be used by the paver to create a finished road way or surface. The disclosed systems and methods may help to reduce waste of paving materials and increase paving efficiency, helping to reduce cost.

In some examples, a central computing system can be used to receive sensor measurements, including temperature measurements, and location information from haul trucks and paving machines to determine optimal load times of haul trucks such that constant temperature can be maintained during paving. The central computing system can then provide an alert to a paving material plant operator to indicate that a haul truck should be loaded.

What is claimed is:

1. A method for controlling frequency of loading for a load truck, the method comprising:
   receiving, from a paving machine, a signal indicating an amount of paving material currently at the paving machine and a production rate of the paving machine;
   determining a time at which to provide additional paving material to the paving machine based on the amount of paving material at the paving machine and on the production rate; and
   providing an alert to trigger loading paving material into a haul truck based on the determined time, wherein the trigger is provided based on an estimated time between loading paving material into the haul truck and arrival of the haul truck at the paving machine.

2. The method of claim 1, further comprising:
   adjusting the determined time for the trigger based on availability of another haul truck for providing paving material to the paving machine.

3. The method of claim 1, further comprising:
   adjusting the determined time of the trigger based on estimated cooling of the paving material between loading the paving material into the haul truck and arrival of the haul truck at the paving machine.

4. The method of claim 1, further comprising:
   receiving, from the haul truck, a haul truck location signal indicative of a location of the haul truck.

5. The method of claim 4, further comprising:
   providing an estimated arrival time of the haul truck at a paving material plant based on the location of the haul truck; and
   providing a trigger to trigger production of a batch of paving material based on the estimated arrival time.

6. The method of claim 5, further comprising:
   accessing at least one of traffic information and weather information within a range of the location of the haul truck; and
   adjusting the estimated arrival time based on at least one of the traffic information and the weather information.

7. The method of claim 1, further comprising:
   receiving temperature information from the paving machine indicative of temperature of the paving material during at least one of: loading of the paving material into the paving machine, application of the paving material to a surface, and a time subsequent to application of the paving material to the surface.

8. The method of claim 7, further comprising:
   adjusting the determined time for the trigger based on ambient temperature and on temperature of the paving material.

9. The method of claim 1, further comprising:
   receiving information from the paving machine indicating overcooling of the paving material at a hopper of the paving machine; and adjusting the determined time for the trigger responsive to receiving information indicating overcooling.

10. The method of claim 1, further comprising:
receiving information from the paving machine indicating overheating of the paving material at a screed of the paving machine; and
adjusting the determined time for the trigger responsive to receiving information indicating overheating.

11. A system for controlling frequency of loading a haul truck, the system comprising:
a network interface device to receive a signal indicating an amount of paving material currently at a paving machine and a production rate of the paving machine; and
a hardware processor coupled to the network interface device and configured to:
determine a time at which to provide additional paving material to the paving machine based on the amount of paving material at the paving machine and on the production rate; and
encode, for transmission over the network interface device, an alert to trigger loading paving material into a haul truck based on the determined time, wherein the trigger is provided based on an estimated time between loading paving material into the haul truck and arrival of the haul truck at the paving machine.

12. The system of claim 11,
wherein the estimated time between loading paving material into the haul truck and arrival of the haul truck at the paving machine is based on at least one of traffic information, weather information, location information of the haul truck, and location information of the paving machine; and
wherein the hardware processor is further configured to adjust the determined time of the trigger based on estimated cooling of the paving material between loading the paving material into the haul truck and arrival of the haul truck at the paving machine.

13. The system of claim 12, wherein the hardware processor is further configured to trigger production of a batch of paving material based on at least one of estimated time of arrival of the haul truck and estimated cooling of the paving material.

14. The system of claim 11, wherein the hardware processor is further configured to:
receive information indicating at least one of overheating and overcooling of the paving material; and
adjust the trigger time responsive to receiving the information.

15. A computer-readable medium including instructions that, when implemented on an apparatus, cause the apparatus to perform operations including:
receiving an indication of an amount of paving material currently at a paving machine and a production rate of the paving machine;
determining a time at which to provide additional paving material to the paving machine based on the amount of paving material at the paving machine and on the production rate; and
encoding an alert to trigger loading of paving material into a haul truck based on the determined time, wherein the trigger is provided based on an estimated time between loading paving material into the haul truck and arrival of the haul truck at the paving machine.

16. The computer-readable medium of claim 15, wherein the operations further include:
adjusting the determined time of the trigger based on estimated cooling of the paving material between loading the paving material into the haul truck and arrival of the haul truck at the paving machine.

17. The computer-readable medium of claim 15, wherein the operations further include:
receiving, from the haul truck, a haul truck location signal indicative of a location of the haul truck;
providing an estimated arrival time of the haul truck at a paving material plant based on the location of the haul truck; and
providing a trigger to trigger production of a batch of paving material based on the estimated arrival time.

18. The computer-readable medium of claim 17, wherein the operations further include:
accessing at least one of traffic information and weather information within a range of the location of the haul truck; and
adjusting the estimated arrival time based on at least one of the traffic information and the weather information.

* * * * *